United States Patent Office 2,917,552
Patented Dec. 15, 1959

2,917,552

PREPARATION OF ALDRIN

Willem L. L. M. Luijckx and Nellius G. Kramer, both of Vlaardingen, Netherlands, assignors to Shell Development Company, New York, N.Y., a corporation of Delaware No Drawing. Application March 5, 1957
Serial No. 643,953

Claims priority, application Netherlands April 27, 1956

10 Claims. (Cl. 260—648)

This invention relates to an improved process for the preparation of the insecticide aldrin. More specifically, the present invention concerns an improved process for the preparation of pure aldrin wherein hexachloropentadiene is reacted with (2.2.1)-bicyclo-2,5-heptadiene in the presence of an HCl acceptor.

Aldrin is an insecticidal mixture containing 1,2,3,4,10,10-hexachloro-1,4,4a,5,8,8a-hexahydro-1,4,5,8-endo, exo-dimethanonaphthalene. In the past aldrin has been prepared by reacting hexachlorocyclopentadiene, hereinafter referred to as "hex" with an excess of (2.2.1)-bicyclo-2,5-heptadiene, hereinafter referred to as "M–101." In this reaction 1 mol of "hex" combines with 1 mol of "M–101" to form 1 mol of 1,2,3,4,10,10-hexachloro-1,4,4a,5,8,8a-hexahydro-1,4,5,8-endo, exo-dimethanonaphthalene commonly known as "compound 118." A number of compounds closely related to "compound 118" are also present in the aldrin mixture. For example, the mixture usually contains a significant quantity of the stereo-isomer of "compound 118," hereinafter referred to as "compound 711." After stripping off excess "M–101," technical aldrin is obtained. Technical aldrin contains approximately 85% by weight of "compound 118" and has a melting point ranging between about 55 and 60° C. Since the stripping must be carried out at temperatures above the melting point of technical aldrin, the aldrin is obtained in a molten state. In order to reduce the molten insecticide to a workable form, it must be allowed to solidify. This may be done in one of three ways. First, the molten material may simply be allowed to cool to room temperature. Second, it may be dissolved in a suitable solvent, such as benzene. Third, it may be converted into flakes by employing suitable flaking apparatus.

For commercial formulations, it has been found preferable to employ aldrin in the form of flakes or powder. Flaked or powdered aldrin is more economical to convey and easier to formulate than other forms of the insecticide. However, the use of solid technical aldrin in the form of flakes as starting material has several shortcomings. For example, if stored, even for short periods of time in air-tight drums, flaked technical aldrin forms sticky fragments which can only be ground to a powder with great difficulty and, moreover, necessitates the employment of special grinding machinery.

Heretofore, these drawbacks have been avoided by preparing aldrin having a melting point in excess of 60° C. and containing more than 85% of "compound 118." Aldrin meeting these stringent requirements has been made through purifying technical aldrin by distillation or crystallization. Distillation is considered prohibitively expensive for commercial purposes and substantially reduces the total yield of pure product. Crystallization, which must be carried out at temperatures below zero, is also accompanied by severe shortcomings. For example, low temperature solvent crystallization is attended by a considerable amount of energy. Moreover, the filter cake so produced must be further treated. Even then the aldrin produced by crystallization is only 40–50% pure.

It is, consequently, the principal object of the present invention to provide a process for the preparation of aldrin having a melting point in excess of 60° C. and containing more than 85% "compound 118" which avoids the shortcomings of prior methods.

Another object of the present invention is to provide a process for the preparation of aldrin having a melting point in excess of 60° C. and containing more than 85% "compound 118," which does not involve separate purification steps.

Yet another object of the present invention is to provide a simple continuous process for the preparation of aldrin having a melting point in excess of 60° C. and containing more than 85% "compound 118," which does require special grinding machinery.

Other objects, features, and advantages will be apparent from the following description read in conjunction with the appended claims.

According to the present invention, aldrin is prepared by reacting "hex" and "M–101" in the presence of an HCl acceptor. The aldrin so produced contains approximately 90% "compound 118" and has a melting point of about 80° C. Moreover, this insecticidal mixture can be easily worked up into flakes which retain their shapes even after extended periods of storage under changing conditions of temperature and humidity. Recourse to special grinding equipment is consequently rendered unnecessary.

Both organic and inorganic HCl acceptors may be used. Good results are obtained if one or more epoxides are used as HCl acceptor.

These epoxy compounds may be represented by the general structural formula:

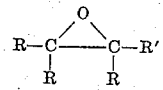

in which each R is a hydrogen atom, an alkyl group or an aryl group, and R' is a hydrogen atom, an alkyl group, a halogen-substituted alkyl group or an alkyl group containing as substituent an oxygen function such as the ether bond (—O—) or the ester bond (—O—CO—).

Examples of unsubstituted epoxy compounds suitable for use are, in the simplest case, the oxides of alkenes, such as ethylene oxide, propylene oxide and butylene oxide. Examples of halogen-substituted oxirane compounds of the above-mentioned formula are the epihalohydrins, particularly epichlorohydrin.

Epoxy-substituted aliphatic compounds satisfying the above-mentioned formula, and which contain an extra oxygen function, such as glycidol and glycidyl ethers and glycidyl esters in particular, were found to be equally suitable.

Another group of compounds found suitable is the nitrogen bases. Examples are urea, thiourea, hexamethylenetetramine, and also mono-, di- and trialkyl amines. Certain nitrogen bases, such as urea, cause a brown coloration of the solid aldrin. Although its properties are similar to those of aldrin prepared with other MCl acceptors, the discoloration may be less desirable, so that the use of an HCl acceptor not containing nitrogen is preferred.

The most desirable HCl acceptors are inorganic, alkaline-reacting compounds, particularly compounds derived from an alkali metal or alkaline earth metal. For example, the alkaline-reacting salts of alkali metals or alkaline earth metals such as bicarbonates, carbonates and basic phosphates have been found very satisfactory. Sodium, potassium and calcium are considered of particular value in this connection. The alkali metal hydroxides, in particular NaOH, are preferably used.

When 0.1% by weight of NaOH, calculated on the total quantity of reactants, was used as the HCl acceptor, aldrin was obtained with an approximately 90% by weight content of "compound 118," i.e. an increase of nearly 6% as compared to the "compound 118" content of "technical" aldrin. It was found that the melting point had increased from 55° C.–60° C. to approximately 80° C. The color of the flakes prepared from the aldrin thus obtained was whitish yellow, while the color of the flakes prepared from "technical" aldrin was dark brown. Both the storage stability and grinding characteristics of the flakes were of high standard.

Approximately 0.01 to 1% by weight of the HCl acceptor based on the total quantity of reaction components has been found sufficient. It will be readily understood, however, that the quantity of HCl acceptor may vary above and below this range without departing from the scope of the invention.

The acceptor is preferably present at the beginning of the reaction. When the reaction is carried out continuously, it has been found highly desirable to add the acceptor to one of the reactants. It is unnecessary however to remove the spent HCl acceptor from the final product.

The surprising result brought about by the addition of an HCl acceptor is particularly evident when it is desired to carry out the preparation of the aldrin continuously. In any apparatus used for the continuous preparation of aldrin, it is most important that the reaction is carried out under stationary homogeneous conditions. In other words, not only must the reactants be homogeneously mixed with one another, but also with the entire reaction mixture. One apparatus found satisfactory for the continuous preparation of aldrin is described in Belgian patent specification No. 535,907. This apparatus consists of a reactor in which the wall, in any section, has flowing lines, the greatest dimension being not more than 4 times as large as the smallest, and which is provided with a tangential supply line and an outlet. It has been found that the apparatus employed in the present process should preferably have at least two reactors of this general type connected in series. With the use of such apparatus residence time per reactor of approximately 2 hours at a temperature of approximately 130° C. and a pressure of approximately 4 kg. per sq. cm. is sufficient for completion of the reaction. At the preferred temperature of approximately 120° C. the required residence time is approximately 11 hours with two reactors and about 7 hours with 3 reactors. A batchwise preparation on the other hand, requires approximately 18 hours without the presence of an HCl acceptor, usable aldrin could not be obtained. The significant advance in the art brought about through the employment of an HCl acceptor is thus immediately evident. The following examples are set forth to illustrate the invention but it is to be understood that they are not to be construed as limitations thereon:

EXAMPLE I 750 g. of (2.2.1)-bicyclo-2,5-heptadiene (8.16 mols) were introduced into a reaction vessel at approximately 100° C. whereupon 750 g. of dry hexachlorocyclopentadiene (2.74 mols) were gradually added, maintenance of the reaction temperature being insured by elimination of the reaction heat. The reaction was complete after approximately 18 hours.

The aldrin formed, dissolved in the excess of "M–101," was then distilled at atmospheric pressure in two stages in order to remove the excess of "M–101." The aldrin was withdrawn from the second stage in liquid form and was then worked up into flakes on roll mills. The resultant technical aldrin contained approximately 85% by weight of "compound 118" and had a melting point of approximately 58° C. The color of the flakes prepared therefrom was dark brown and was difficult to grind. The grinding machine became clogged after only a short time. When stored at temperatures of between 20° C. and 25° C. the flakes, which initially possessed good appearance changed in a few days to hard, dark brown fragments which were practically unworkable. The yield of "compound 118," calculated on "hex," was approximately 90 mol percent.

In exactly the same manner, starting from the same quantity of reactants, a quantity of aldrin was again prepared with the exception that in this case 0.2% by weight of an epichlorohydrin was present. With a somewhat increased yield (approximately 92 mol. percent) aldrin was obtained with a content of "compound 118" of approximately 87% by weight and having a melting point of approximately 75° C. The color of the flakes prepared therefrom was light brown. They could be more easily ground and the stability had increased.

When the technical aldrin prepared according to the first procedure mentioned above was further purified by repeated distillation and/or crystallization until a product was obtained having a melting point of between 80° C. and 85° C. and a "compound 118" content of approximately 88%, the yield dropped to approximately 60 to 70 mol. percent.

EXAMPLE II

Following the procedure described in Example I, and starting from the same quantity of reactants, a quantity of aldrin was again prepared with the exception that in this case 0.1% by weight sodium hydroxide was present. Aldrin was obtained with a content of approximately 90% by weight of "compound 118" and a melting point of approximately 80° C. The color of the flakes was light yellow. They could be easily ground and the stability was high.

EXAMPLE III

Following the procedure described in Example I and starting from the same quantity of reactants a quantity of aldrin was again prepared with the exception that in this case 0.1% by weight ethylene oxide was present. Aldrin was obtained with a content of approximately 90% by weight of "compound 118" and a melting point of approximately 80° C. The color of the flakes was light brown. They could be easily ground and the stability was high.

EXAMPLE IV

Following the procedure described in Example I and starting from the same quantity of reactants a quantity of aldrin was again prepared with the exception that in this case 0.1% by weight urea was present. Aldrin was obtained with a content of approximately 90% by weight of "compound 118" and a melting point of approximately 80° C. The color of the flakes was light brown. They could be easily ground and the stability was high.

EXAMPLE V

Employing two reactors connected in series (2.2.1)-bicyclo-2,5-heptadiene were reacted with dry hexachlorocyclopentadiene in the presence of .03% by weight sodium hydroxide under a pressure of 4.0 kg. per square cm. The mole ratio of M–101 to hex was 3:1. The total residence time was approximately 3.75 hours and the temperature was maintained at approximately 140° C. Aldrin was obtained with a content of 82.6% "compound 118."

EXAMPLE VI

A number of comparative tests were made, using epichlorohydrin or NaOH as HCl acceptors. Moreover, the tests were made, using pure "hex" and "M–101" as initial materials, as well as "hex" and "M–101" of a quality as used in large-scale production. The results of these tests are shown in the following three tables.

In all tests the reaction conditions usual for the preparation of aldrin, as given in Example I, were adhered to:

Table I
LABORATORY TESTS WITH PURE "HEX" AND "M-101"

| Addition (in percent by weight) of HCl acceptor | Color | Melting Point, °C. | Percent "118" (percent by weight) |
|---|---|---|---|
| No addition | 5 | 70 | 89 |
| 0.4 ECH | 6 | 72 | 88 |
| 1.0 NaOH (solid) | 6 | 90 | 91 |
| 0.1 NaOH (solid) | 4 | 88 | 90 |
| 0.1 NaOH in the form of a 5% H₂O solution | 3 | 86 | 91 |
| 0.1 NaOH in the form of a 40% H₂O solution | 3 | 88 | 93 |

The color was determined according to the method employed by Gardner, as described in H. A. Gardner, "Physical and Chemical Examination of Paints, Varnishes, Lacquers and Colors," 1939, p. 72.

Table II
LABORATORY EXPERIMENTS WITH "HEX" AND "M-101" OF TECHNICAL QUALITY

| Addition (in percent by weight) of HCl acceptor | Color (acc. to Gardner) | Melting Point, °C. | Percent "compound 118" (percent by weight) |
|---|---|---|---|
| No addition | 13 | 63 | 85 |
| 0.1 NaOH (solid) | 10 | 79 | 88 |
| 0.1 NaOH in the form of a 5% H₂O solution | 4 | 83 | 88.5 |
| 0.1 NaOH in the form of a 40% H₂O solution | 3 | 88 | 90 |

As compared to the previous table, it is particularly noticeable that in the case of reagents of technical quality having a lower degree of purity than "hex" and "M-101" of laboratory quality, the improvement in color and melting point effected by the HCl acceptor is much greater.

Table III
PLANT EXPERIMENTS WITH "HEX" AND "M-101" OF TECHNICAL QUALITY

| Addition (in percent by weight) of HCl acceptor | Color (acc. to Gardner) | Melting Point, °C. | Percent "compound 118" (percent by weight) |
|---|---|---|---|
| No addition | 14+ | 64 | 86.0 |
| 0.1 NaOH in the form of a 5% H₂O solution | 4 | 78 | 88.2 |
| 0.1 NaOH in the form of a 40% H₂O solution | 3 | 84 | 90.0 |

The improvements are all of the same order of magnitude as in the case of the laboratory experiment and this proves that the HCl acceptor is also useful when used on a plant scale.

It was found desirable, when using aqueous NaOH solutions as HCl acceptor, to employ solutions with concentrations of at least 20% by weight, since otherwise too much water is introduced into the reaction medium.

It will be appreciated that while specific embodiments of the invention have been presented, numerous other specific embodiments will be apparent to those skilled in the art, and, therefore that the invention should not be construed as limited except by the hereto appended claims.

Having described this invention in full what is desired to be protected by United States Letters Patent is:

1. The process for the preparation of aldrin comprising the steps of homogeneously mixing in the liquid phase at an elevated temperature hexachlorocyclopentadiene with (2.2.1)-bicyclo-2,5-heptadiene in the presence of a minor amount of an HCl acceptor selected from the group consisting of epoxy compounds having the formula

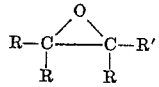

wherein each R is chosen from the group consisting of a hydrogen atom, an alkyl radical and an aryl radical, and R' is chosen from the group consisting of a hydrogen atom and an alkyl radical, organic basic reacting nitrogen compounds and inorganic alkaline reacting compounds.

2. The process for the preparation of aldrin comprising the steps of homogeneously mixing in the liquid phase at an elevated temperature hexachlorocyclopentadiene and (2.2.1)-bicyclo-2,5-heptadiene in the presence of a minor amount of a compound having the formula

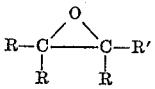

wherein each R is chosen from the group consisting of a hydrogen atom, an alkyl radical and an aryl radical, and R' is chosen from the group consisting of a hydrogen atom and an alkyl radical.

3. The process for the preparation of aldrin comprising the steps of homogeneously mixing in the liquid phase at an elevated temperature hexachlorocyclopentadiene and (2.2.1)-bicyclo-2,5-heptadiene in the presence of a minor amount of an inorganic alkaline reacting compound.

4. The process for the preparation of aldrin comprising the steps of homogeneously mixing in the liquid phase at an elevated temperature hexachlorocyclopentadiene and (2.2.1)-bicyclo-2,5-heptadiene in the presence of a minor amount of epichlorohydrin.

5. The process for the preparation of aldrin comprising the steps of homogeneously mixing in the liquid phase at an elevated temperature hexachlorocyclopentadiene and (2.2.1)-bicyclo-2,5-heptadiene in the presence of a minor amount of sodium hydroxide.

6. The process for the preparation of aldrin comprising the steps of reacting hexachlorocyclopentadiene with (2.2.1)-bicyclo-2,5-heptadiene in the liquid phase at an elevated temperature under homogeneous conditions in the presence of 0.01–1% by weight of epichlorohydrin based on the total weight of the reaction components.

7. The process for the preparation of aldrin comprising the steps of reacting hexachlorocyclopentadiene with (2.2.1)-bicyclo-2,5-heptadiene in the liquid phase at an elevated temperature under homogeneous conditions in the presence of 0.01–1% by weight of sodium hydroxide based on the total weight of the reaction components.

8. The process for the preparation of aldrin comprising the steps of reacting hexachlorocyclopentadiene with (2.2.1)-bicyclo-2,5-heptadiene in the liquid phase at an elevated temperature under homogeneous conditions in the presence of 0.01–1% by weight of alkylene oxide based on the total weight of the reaction components.

9. The process for the preparation of aldrin comprising the steps of reacting hexachlorocyclopentadiene with (2.2.1)-bicyclo-2,5-heptadiene in the liquid phase at an elevated temperature under homogeneous conditions in the presence of 0.01–1% by weight of ethylene oxide based on the total weight of the reaction components.

10. The process for the preparation of aldrin comprising the steps of reacting hexachlorocyclopentadiene with (2.2.1)-bicyclo-2,5-heptadiene in the liquid phase at an elevated temperature under homogeneous conditions in the presence of 0.01–1% by weight of sodium hydroxide based on the total weight of the reaction components.

References Cited in the file of this patent
FOREIGN PATENTS 151,645    Australia _____ June 1, 1953